3,541,119
METHOD OF PRODUCING UNSATURATED SULFONES

Sven U. K. A. Richter, Stocksund, Sweden, and Alexandros K. Tsolis, Upton, N.Y., assignors to Sanitized, Incorporated, New York, N.Y., a corporation of New York
No Drawing. Continuation-in-part of application Ser. No. 516,770, Dec. 27, 1965. This application Apr. 10, 1969, Ser. No. 815,220
Int. Cl. C07c *147/00, 147/04, 147/08*
U.S. Cl. 260—397.6         10 Claims

ABSTRACT OF THE DISCLOSURE

A single step method for producing $\alpha,\beta$-unsaturated sulfones of the formula $$R-SO_2C=C-X$$
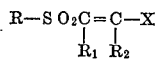

wherein R is an alkyl, substituted alkyl, aryl, substituted aryl, cycloalkyl or heterocyclic radical; $R_1$ and $R_2$ are hydrogen, alkyl, substituted alkyl, aryl, substituted aryl or an acyl radical; and where X is an electron withdrawing stabilizing group. The method involves reacting an $\alpha,\beta$-dihalogenide and a sulfinic acid reactant in a liquid reaction medium in the presence of an added alkaline material.

---

This application is a continuation-in-part of application Ser. No. 516,770, filed Dec. 27, 1965, now abandoned.

BACKGROUND

This invention relates to a method of producing $\alpha,\beta$-unsaturated sulfones. More particularly it relates to a method of producing such sulfones having bioactive properties.

A principal object of the present invention is to provide a simple and economical one-step method of producing $\alpha,\beta$-unsaturated sulfones which results in commercially acceptable yields.

Heretofore, a number of methods for preparing $\alpha,\beta$-unsaturated sulfones have been described in the literature, but they are generally characterized by the necessity of using uncommon and expensive raw materials and intermediates, multi-step procedures with isolation of intermediates, difficulty in preparation and low yields.

An example of a multi-step reaction for the production of $\alpha,\beta$-unsaturated sulfones is disclosed in U.S. Pat. No. 3,159,666 issued to Heininger et al. on Dec. 1, 1964. In this patent, 3-(4-chlorobenzenesulfonyl) acrylonitrile is prepared by the reaction of para-chlorobenzenesulfenyl chloride ($ClC_6H_4SCl$) and acrylonitrile which resulted in a mixture of para-chlorobenzenethiochloropropionitrile and para-chlorobenzenethioacrylonitrile. This mixture was then oxidized with hydrozen peroxide in glacial acetic acid, and some 2-chloro-3-(4-chlorobenzenesulfonyl)-propionitrile was recovered. This saturated sulfone was in turn dehydrohalogenated using triethylamine to obtain the unsaturated sulfone in very small overall yield.

U.S. Pat. No. 3,078,298 issued to Gregory et al. on Feb. 19, 1963, teaches another multi-step method of preparation of certain $\alpha\beta$-unsaturated sulfones. Particularly, this patent discloses that an alkanesulfonylacrylonitrile can be prepared by the addition of a thiol to $\alpha$-chloroacrylonitrile, which in turn is prepared by the dehydrohalogenation of dichloropropionitrile. The saturated alkyl thiochloropropionitrile can then be dehydrohalogenated with triethylamine to form alkyl thioacrylonitrile, which, after oxidation, gives an alkanesulfonylacrylonitrile.

The above mentioned saturated akyl thiochloropropiopionitriles and in general saturated aliphatic and aromatic thio- and sulfonyl-, chloro- and bromo-alkanenitriles can be produced in accordance with U.S. Pat. No. 3,140,306 issued to Heininger et al. on July 7, 1964, by the reaction of a thiol or a sulfinate with dichloro-or dibromopropionitrile. In this patent, a solution in water of sodium p-toluene-sulfinate treated with 2, 3-dichloro-propionitrile, and an impure product of 3-(p-toluene-sulfonyl)-2-chloropropionitrile was obtained in 34% yield. The chemical composition of this product was verified by dehydrohalogenation with triethylamine in ether resulting in an impure specimen of 3-(toluene-sulfonyl) acrylonitrile.

In accordance with the method of our invention, we have been able to obtain $\alpha,\beta$-unsaturated sulfones in a simple one-step reaction resulting in high yields. The reaction basically involves contacting, in the presence of an added alkaline promoter, a sulfinic acid or a salt thereof and a vicinal $\alpha,\beta$-dihalogenide containing an electron withdrawing stabilizing group in a reaction medium consisting of a solvent or solvent mixtures, in which both reactants and the alkaline promoter are at least partly soluble. Examples of $\alpha,\beta$-unsatured sulfones produced by the method of the invention may be characterized by the formula:

$$RSO_2C=C-X$$
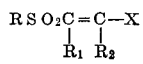

where:

R is an alkyl having 1-18 carbon atoms, substituted alkyl having 1-18 carbon atoms, aryl, substituted aryl, cycloalkyl having up to 6 carbon atoms or heterocyclic radical;

$R_1$ and $R_2$ are hydrogen, alkyl, substituted alkyl, aryl, substituted aryl or acyl radical; and X is an electron withdrawing stabilizing group such as: —CN, —COOR, —COOH, —COOM, —CONH$_2$, —CONHR, —CONRR, —SO$_2$R, —SO$_2$OR, —NO$_2$, —CHO, and —COR.

In reference to the members of the electron withdrawing group listed above for X, hereinafter, the members of the group will be referred to as carbanion stabilizing groups. While it is not precisely known what function these carbanion stabilizing groups perform in the method of the invention, it is postulated that they aid in loosening the C–H bonds of the dihalogenide, thus enabling the single step alkali promoted reaction embodying our invention.

Generally speaking, the sulfinic acid reactant is of the formula:

(2)         R—SO$_2$—M wherein R is as given above and M is a cation such as the alkali metals Na, K, Li, Cs, Rb; or NH$_4$; alkaline earth metals such as Ca, Ba, or Mg; or any other metal which when in the sulfinate salt form is partly soluble in the reaction medium; or hydrogen.

The sulfinic acid reactant as characterized by Formula 2 can be produced by a number of well known methods. One of the more convenient and economical methods is to reduce an organic sulfonyl chloride with an alkali metal sulfite. This is usually done in an aqueous solution and the alkali metal sulfinate is recovered by crystallization and recrystallization.

For use in the method of embodying this invention, we have found unexpectedly that the crude reaction mixture, resulting from the sulfite reduction of the organic sulfonyl chloride, can be used directly in the process without requiring any further purification or isolation. This is of great economic significance, since additional processing with corresponding reduction in yield is avoided.

Another method of producing the sulfinates employed in the method of the invention is to react an alkali metal or ammonium hydroxide with a sulfinic acid, as mentioned in U.S. Pat. No. 3,140,306 to Heininger. The following are illustrative of sulfinic acids which can be employed in this procedure: methanesulfinic acid, ethanesulfinic acid, 1-butanesulfinic acid, isopentanesulfinic acid, heptanesulfinic acid, dodecanesulfinic acid, octadecanesulfinic acid, $\beta$-hydroxyethanesulfinic acid, $\beta(\beta$-hydroxyethylsulfonyl) ethanesulfinic acid, 3-propenesulfinic acid, 2-phenylethanesulfinic acid, cyanovinylsulfinic acid, benzenesulfinic acids, o-, m-, p-toluenesulfinic acid, p-chlorobenzenesulfinic acid, 2-bromoethylbenzenesulfinic acid, cyanobenzenesulfinic acids, methoxybenzenesulfinic acids, 4-hydroxy-3-carboxybenzenesulfinic acid, acylamidobenzenesulfinic acids, 4-acetamidobenzenesulfinic, 4 - phenylsulfonylbenzenesulfinic acid 4 - phenoxybenzenesulfinic acid, 4-phenylthiobenzenesulfinic acid, 4-vinylbenzenesulfinic acid, nitrobenzenesulfinic acids, aminobenzenesulfinic acids, cyclopentanesulfinic acid, cyclohexanesulfinic acid, ethanedisulfinic acid, butanedisulfinic acid, benzenedisulfinic acids, oxy-bis(benzenesulfinic) acid, pyridinesulfinic acid, thiophenesulfinic acid, quinolinesulfinic acid and abietylsulfinic acid.

The sulfinic acid to be used is selected such that its metal or ammonium salt is at least partly soluble in the reaction medium employed.

The vicinal $\alpha,\beta$-dihalogenides containing carbanion stabilizing groups employed in the present invention are represented by the formula:

(3) 

wherein $R_1$, $R_2$, and X are given above, and Y and Z are halogens such as Cl, Br, and I. Preferably, Y and Z are the same halogen and for reasons of economy Br and Cl are particularly preferred.

As in the case of the sulfinate, the vicinal dihalogenides may be prepared for use in the method of the invention by any number of known methods. One convenient method is by the direct halogenation of a corresponding vinyl compound by addition of halogen to the vinyl compound, preferably in the presence of a catalyst.

As in the preparation of the sulfinates, we have found that another advantage to our invention lies in the fact that it is not necessary to use distilled or otherwise purified vicinal dihalogenides for the preparation of the unsaturated sulfones.

The added alkaline material or promoter used in the method of the invention may be either inorganic or organic in nature. Moreover, it is advantageous to employ weakly basic materials with buffering action, such as mixtures of alkali metal phosphates, bicarbonates or organic acid salts. The use of the weakly alkaline materials is important, since many $\alpha,\beta$-unsaturated sulfones produced by the method of the invention are sensitive to alkali, in particular the cyanovinyl sulfones. In the case of these latter mentioned sulfones, attempts to use strongly alkaline materials including certain amines resulted in evident deterioration of the product. We unexpectedly found, however, that use of the alkali metal or ammonium salts of carboxylic acids, specifically, sodium, potassium or ammonium acetate, resulted in excellent yields of high purity with little if any product deterioration. The alkali metal carboxylate can be utilized as pure compounds added in solid form to the reaction mixture, or they can be added in solution.

As mentioned earlier, the reaction medium may be a solvent or a mixture of solvents. In this regard, water, the lower alcohols, such as methanol, ethanol, etc., or mixture of water and alcohol may be used as the reaction medium as long as the reactants have some solubility in the chosen medium. Of course, the choice of the solvent or mixture will be governed by such factors as economy for the particular application, and ease of recovery of the product as well as many other considerations. In all instances, however, the solvents used should be substantially non-reactive with the reactants under the prevalent reaction conditions.

In addition, the solvent or solvent mixture may contain a small amount of an added surface active agent. This is especially advantageous where the reactants employed are not completely soluble in the chosen reaction medium as contact between the reactants will be improved. A polymerization inhibitor may also be added to the reaction mixture to avoid possible polymerization of polymerizable reactants.

As to the reaction conditions, namely temperature, pressure, and pH, there does not appear to be any great degree of criticality. In most instances, the reaction takes place under mild conditions of temperature and pressure. In fact, one of the advantages of the method of the invention lies in the fact that the reaction is best carried out at room temperature and at atmospheric pressure. However, experimentation has shown that temperature and pressure may be varied as is desirable. A pH range of from 4–11 is acceptable and in part may be controlled by the manner, quantity and rate of addition of the alkaline matter described above. However, the preferred range of pH is between 5 and 9, and in case of the more alkali sensitive cyanovinyl sulfones, the reaction mixture is best maintained between pH 5 to 7.

In addition, unsaturated sulfones characterized by the following formula may be made by the method of our invention:

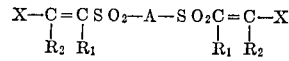

wherein X, $R_1$ and $R_2$ are the same as given for Formula 1, and A is a divalent organic group selected from the group consisting of straight chain alkylidene, branched alkylidene, substituted alkylidene, arylidene, substituted arylidene, cycloalkylidene, substituted cycloalkylidene, and a heterocyclic radical, may also be produced by the method of the invention.

In this embodiment, a vicinal dihalogenide as represented by Formula 3 is contacted in the presence of an added alkaline material, as described above, with a bis-sulfinic acid reactant of the formula:

(5) $\qquad MSO_2—A—SO_2M$ wherein A is as given above in Formula 4 and M is a cation such as hydrogen, $NH_4$, the alkali metals, such as Na, K, Li, Cs, or Rb; alkaline earth metals, such as Ca, Ba, or Mg; or any other metal which in sulfinate salt form is partly soluble in the reaction medium to produce the unsaturated sulfone or Formula 4.

All conditions common to the reaction which forms the unsaturated sulfones of Formula 1 may be the same as those employed in reaction in forming the unsaturated sulfones of Formula 4.

The $\alpha\beta$ unsaturated sulfones made by the method of the invention can usually exist in both the trans and cis form. Under the preferred reaction conditions it appears that the trans compounds are predominantly formed and in many cases this is advantageous, since the trans form is often the most bioactive stereoisomer. However, while this is in certain instances an advantage, we do not limit the scope of this invention to one or the other of the stereoisomers, but consider the method a general one for the manufacture of unsaturated sulfones containing additional carbanion stabilizing groups.

The invention will be further illustrated by the following specific examples. It should be understood, however, that while these examples may describe specific features of the invention, they are presented primarily for the purpse of illustration and the method of the invention in its broader aspects is not limited thereto.

EXAMPLE I

This is an example of the preparation of p-toluenesulfonylacrylonitrile by the method of the invention. First, 21.4 g. (0.1 mole) of sodium p-toluenesulfinate containing 2 moles of crystal water were dissolved in a reaction flask containing a mixture of 100 ml. of methanol and 50 ml. of water. The pH of the solution at this point was about 6.6. To this flask was added 16.4 g. (0.2 mole) of sodium acetate which dissolved almost immediately causing the pH to rise to 9.9. Next, there was added to the flask 13.6 g. (0.11 mole) of 2,3-dichloropropionitrile dissolved in 20 ml. of methanol. With this addition the pH dropped to 7.0. A few minutes after the addition of the dihalogenide the pH fell to 6.3 and a precipitate began to form. The reaction was allowed to continue for 2 hours with stirring and at the end of this period the pH was 5.8. At this point, the reaction mixture was poured into 400 ml. of cold water and stirred for about 10 minutes. The slurry was filtered and the residue on the filter was washed with 75 ml. of cold water followed by a wash with 10 ml. of cold methanol. The filter cake was then dissolved in 150 ml. of chloroform and treated with anhydrous magnesium sulfate, then filtered. Upon evaporation of the chloroform, 14.2 g. of p-toluenesulfonylacrylonitrile identified by infrared spectrum and a melting point of 129–130° C. was obtained corresponding to a yield of about 68.6%.

EXAMPLE II

This example demonstrates the results of reacting a sulfinate salt with a vicinal dihalogenide without any added alkaline material being present.

Approximately 0.05 mole (10.7 g.) of sodium p-toluenesulfinate containing 2 moles of crystal water were dissolved in 42 ml. of water and charged to a reaction flask. To this solution was added 6.2 g. (0.05 mole) of 2,3-dichloropropionitrile dropwise and under stirring at room temperature. No evolution of heat was observed. The reaction mixture was then heated to 75° C. and stirred at that temperature for 30 minutes which resulted in an oily reaction mixture. To this mixture, 40 ml. of methanol were added and the resulting mixture was allowed to stand in a refrigerator overnight. A white crystalline material which separated from the solution upon the overnight stand was filtered and washed with a mixture of equal parts of methanol and water. After air-drying, the crystals were taken up in a small amount of Skelly B solvent, boiled, cooled, and then filtered. Approximately 4.1 g. of a material identified by a melting point range of 76–85° C. and infrared spectrum as predominantly p-toulenesulfonylchloropropionitrile was obtained. No unsaturated sulfone could be isolated from the reaction mixture.

EXAMPLE III

This example is presented to demonstrate the ease by which unsaturated sulfones may be produced according to the method of the invention from crude starting materials, that is, from the sulfite reduction mixture of an organic sulfonyl chloride and an impure vicinal dihalogenide.

Approximately 2.1 moles (264.7 g.) of technical sodium sulfite and 352.0 g. (4.2 moles) of technical sodium bicarbonate were dissolved in 1 l. of water in a stainless steel kettle equipped with a stirrer. The mixture was heated to 45–50° C. and 467.0 g. (2.0 moles) of technical acetamidobenzenesulfonyl chloride were added in small portions over a 15 minute period. The reaction was continued for ½ hour under stirring allowing the temperature to rise to 76° C. The solution was then cooled to 50–52° C. and 392.6 g. (4 moles) of potassium acetate dispersed in 1.1 l. of methanol were added. After 2-3 minutes, 248 g. (approximately 2 moles) of crude water-washed 2,3-dichloropropionitrile dissolved in 200 ml. of methanol were added and the mixture was stirred for 2 hours. At this point, a light tan precipitate had formed and the batch was poured into 7 l. of cold water and then filtered. The precipitate was washed with about 2 l. of water followed by a methanol wash until the filtrate was almost clear. Approximately 310 g. of an almost white product with a melting point of 268–270° C. were obtained corresponding to a 60% yield. Upon recrystallization of the product a very pure product identified by a melting point of 279–279.5°. C. and infrared spectrum p-acetamidobenzenesulfonylacrylonitrile was obtained in what is believed to be the pure trans form.

EXAMPLE IV

This is an example of the production of benzenesulfonylacrylonitrile by the method of the invention. A reaction flask was charged with 20 g. (0.1 mole) of sodium benzenesulfinate dissolved in 100 ml. of methanol. To this was added 12.4 g. (0.1 mole plus 10% excess) of 2,3-dichloropropionitrile. Next, over a period of ½ hour, 8.2 g. (0.1 mole) of sodium acetate dissolved in 15 ml. of methanol and 15 ml. of water were added dropwise. On stirring at room temperature for 2 hours, the mixture turned yellow and orange and then to a deep orange brown. A solid precipitate which formed during the 2 hours of stirring was filtered from the mixture and extracted with boiling chloroform. Upon addition of 200 ml. of water to the filtrate, brownish gummy crystals separated out. These were then filtered and dissolved in a mixture of chloroform and carbon tetrachloride, with the filtrate being finally extracted with chloroform. Finally, the two choloroform solutions were combined and treated with charcoal which resulted in the production of 11.3 g. of pure benzenesulfonylacrylonitrile having a melting point of 100.5–101.5° C., the yield being 53%.

EXAMPLE V

In this example, the general procedure of Example I was followed with the exception that 7.7 g. (0.1 mole) of ammonium acetate was used instead of the sodium acetate. The result of this experiment was the production of 14.35 g. of p-toluenesulfonylacrylonitrile having a melting point of 128–128.5° C. This corresponded to a yield of about 69.4%.

EXAMPLE VI

This is an example of the production of p-acetamidobenzenesulfonylacrylonitrile by the method of the invention. Approximately 0.4 mole (88 g.) of sodium p-acetamidobenzenesulfinate dissolved in 300 ml. of methanol and 250 ml. of water were charged to a reaction flask. To this solution, 79 g. (0.8 mole) of potassium acetate were added and when this had dissolved, 50 g. (0.4 mole) of 2,3-dichloropropionitrile were added with stirring. The reaction was allowed to continue with stirring for 2½ hours at room temperature, whereupon the reaction mixture was poured into 1.5 l. of cold water, causing a solid to separate out. The separated solid was then filtered and washed with water and then with methanol. After a drying period, 56 g. of p-actamidobenzenesulfonylacrylonitrile, identified by infrared spectrum, was obtained having a melting point of 256–264° C. This corresponded to a yield of 56%.

EXAMPLE VII

This is an example of the preparation of p-acetamidobenzenesulfonylacrylonitrile by the method of the invention. 19.9 g. (0.1 mole) of p-acetamidobenzenesulfinic acid were introduced into a reaction flask containing a stirred mixture of 100 ml. of methanol and 50 ml. of water. To this slurry was added 32.8 g. (0.4 mole) of anhydrous sodium acetate which resulted in the solution turning slightly yellow. Next, 13.6 g. (0.11 mole) of 2,3-dichloropropionitrile dissolved in 20 ml. of methanol was added. This caused the color of the solution to darken to a brownish yellow and after about 10 minutes a precipitate to form. The mixture was then stirred for about 1½ hours. Finally, the slurry was poured into 400 ml. of cold water, washed with water and methanol and then dried. A light tan powder with a melting point of 252–256° C. was obtained and infrared spectrum and analysis showed the substance to be p-acetamidobenzenesulfonylacrylonitrile. The yield was 64%.

EXAMPLE VIII

This is another example dealing with the preparation of p - acetamidobenzenesulfonylacrylonitrile. Approximately 0.05 mole (10 g.) of sodium p-acetamidobenzenesulfinate dissolved in a mixture of 50 ml. of methanol and 25 ml. of water were charged to a reaction flask. To this was added 6.2 g. (0.05 mole) of 2,3-dichloropropionitrile. The mixture was stirred for a few minutes followed by the addition of 30 ml. of Amberlite LA–2, which is a liquid basic ion exchange resin, with constant stirring. This addition caused the immediate formation of a precipitate and the evolution of heat. The reaction mixture was stirred at room temperature for 20 minutes and then cooled in an ice bath under stirring. The precipitate was then separated, washed with cold methanol, and dried. At this point, 7.5 g. of a white solid with a melting point of 238–240° C. was obtained corresponding to a crude yield of 70%. However, upon recrystallization from approximately 600 ml. of ethanol, 5.4 g. of white needles having a melting point of 270–272° C. was obtained. This material was identified by infrared spectrum as p-acetamidobenzenesulfonylacrylonitrile.

EXAMPLE IX

This is an example of the preparation of p-methylbenzenesulfonylacrylonitrile by the method of the invention. A reaction flask was charged with 21.4 g. (0.1 mole) of the sodium salt of p-methylbenzenesulfinic acid containing 2 moles of water dissolved in 100 ml. of methanol. To this solution, 11.2 g. (0.2 mole) of potassium hydroxide was added with stirring and a pH of 11 was observed. Next, 12.4 g. (0.1 mole) of 2,3-dichloropropionitrile dissolved in 25 ml. of methanol was added dropwise to the stirred reaction mixture. After approximately 5 minutes the pH remained at 11 and the color of the solution turned yellow with a small quantity of precipitate appearing. A portion of the precipitate was isolated and identified by a melting point of 129–130° C. and infrared spectrum as p-methylbenzenesulfonylacrylonitrile. However, the reaction was continued at room temperature and after approximately 45 minutes the pH was 9–10. The pH remained at this level until the reaction was completed after a total elapsed time of 1½ hours. The reaction mixture was poured into cold water which produced a reddish-brown clear solution and further addition of water produced no precipitate which in turn prevented the isolation of any further desired reaction product.

This example demonstrates that while a strong alkali, such as potassium hydroxide, may be used as an alkaline agent for promoting the direct preparation of unsaturated sulfones from a sulfinite salt and a vincinal dihalogenide containing a carbanion stabilizing group, the yields are lower and the strong alkalies are less convenient to use compared to the preferred carboxylic acid salts.

EXAMPLE X

This example describes the preparation of methanesulfonylacrylonitrile by the method of the invention. 10.2 g. (0.1 mole) of sodium methanesulfinate prepared by the reduction of methanesulfonyl chloride with sodium sufite were dissolved in a mixture of 100 ml. of methanol and 50 ml. of water and charged to a reaction flask and stirred. To the stirred solution was added 16.4 g. (0.2 mole) of sodium acetate followed by the addition of 12.4 g. (0.1 mole) of 2,3-dichloropropionitrile dissolved in 25 ml. of methanol at an even rate over a 10 minute period. The reaction mixture was then stirred at room temperature for 1 hour, excess water added, filtered and the filtrate extracted with chloroform. On addition of petroleum ether to the chloroform extract a white solid precipitated which was recrystallized from ethanol. This material was identified by a melting point of 107–108° C. and infrared spectrum as methanesulfonylacrylonitrile.

EXAMPLE XI

This is an example of the preparation of ethanesulfonylacrylonitrile by the method of the invention. A reaction flask was charged with 11.6 g. (0.1 mole) of sodium ethanesulfinate, obtained by sodium bisulfite reduction of ethanesulfonyl chloride, dissolved in a mixture of 100 ml. of methanol and 60 ml. of water. To this was added 19.6 g. (0.2 mole) of potassium acetate which dissolved under stirring. Finally, 12.4 g. (0.1 mole) of 2,3-dichloropropionitrile dissolved in 20 ml. of methanol were added over a 10 minute period. The reaction was allowed to continue for 1 hour during which time the temperature increased from 25–40° C. and the mixture took on a golden yellow color. After the reaction mixture was diluted with water and the mixture extracted with chloroform, a small amount of pentane was added to the chloroform extract and a white material formed. This material was identified by a melting point of 43–44° C. and infrared spectrum as ethanesulfonylacrylonitrile. This material is water soluble.

EXAMPLE XII

This is an example of the preparation of p-toluenesulfonylacrylamide by the method of the invention. A reaction flask was charged with 21.4 g. (0.1 mole) of sodium p-toluenesulfinate and 16.2 g. (0.2 mole) of sodium acetate stirred into 100 ml. of methanol. Next, a solution of 14.2 g. (0.1 mole) of 2,3-dichloropropionamide in 15 ml. of methanol and 20 ml. of acetone were added dropwise over 40 minutes to the sulfinate solution. The reaction mixture was allowed to stir for 40 hours whereupon the solids in the solution were separated by filtration and washed with 250 ml. of water in portions. After drying, 7.1 g. of a solid melting at 177.5–180° C. were obtained. This was followed by extracting the washings with chloroform, and after recrystallization from a methanol-chloroform solution an additional 3.3 g. of a solid with a melting point of 183–183.5° C. was obtained. The solid was identified by infrared spectrum as p-toluenesulfonylacrylamide and the yield corresponded to 46.2% of theory.

EXAMPLE XIII

This is an example of the preparation of ethyl p-toluenesulfonylacrylate by the method of the invention. A reaction flask was charged with 21.4 g. (0.1 mole) of sodium para-toluenesulfinate and 16.2 g. (0.2 mole) of sodium acetate dissolved in 100 ml. of methanol at room temperature. To this solution was added 18.8 g. of ethyl 2,3-dichloropropionate (0.1 mole plus 10% excess) dissolved in 25 ml. of methanol in dropwise fashion over 40 minutes with stirring. After 15 minutes a white cloudy solid began to separate out. The reaction mixture was stirred for 20 hours and then filtered. A snow white product was obtained which was washed twice with 5 ml. portions of methanol and then with 250 ml. of water. The melting point of this material was 82.5–84° C. and the yield was 55%. To the combined washings, 250 ml. of water were added and a second crop of slightly gummy white crystals was formed. Upon recrystallization from carbon tetrachloride and petroleum ether and washings with a small amount of methanol, a product identified by a melting point of 80.5–83.5 and infrared spectrum as ethyl p-toluenesulfonylacrylate was obtained. The combined yield was 75% of theory.

EXAMPLE XIV

This is an example of the preparation of $$CH_3 \cdot C_6H_4SO_2CH=C(CH_3)CN$$

by the method of the invention. Approximately 0.1 mole (21.4 g.) of $CH_3 \cdot C_6H_4SO_2Na \cdot 2H_2O$ and 20.3 g. (0.25 mole) of anhydrous sodium acetate were dissolved in a mixture of 75 ml. water and 75 ml. of ethanol and the mixture heated to reflux. At this point, 22.7 g. (0.1 mole) of $CH_2BrCBr(CH_3)CN$ dissolved in 25 ml. of ethanol were added to the reaction mixture over a 10 minute period. Refluxing was continued overnight. A product identified by infrared spectrum analysis as $$CH_3 \cdot C_6H_4SO_2CH=C(CH_3)CN$$

was recovered.

EXAMPLE XV

This is an example of the preparation of $$CH_3 \cdot C_6H_4SO_2CH=CH \cdot COC_6H_5$$

by the method of the invention. A reaction flask was charged with 21.4 g. (0.1 mole) of sodium p-toluenesulfinate containing 2 moles of crystal water and 19.6 g. of potassium acetate dissolved in 150 ml. of methanol. To this was immediately added 29.2 g. of 1,2-dibromoethyl phenyl ketone in 25 ml. of methanol. After stirring for 4 hours, a reaction product identified by infrared spectrum analysis as $CH_3 \cdot C_6H_4SO_2CH=CH \cdot COC_6H_5$ was isolated.

EXAMPLE XVI

This is an example of 1-phenyl-1 (p-toluenesulfonyl) 2-nitroethylene prepared by the method of the invention. 21.4 g. (0.1 mole) of sodium p-toluenesulfinate containing 2 moles of crystal water or 19.6 g. (0.2 mole) of potassium acetate were dissolved in 150 ml. of methanol and charged to a reaction flask. At this point, 30.9 g. (0.1 mole) of 1-phenyl-1,2-dibromo-2-nitroethylene in 25 ml. of methanol were added and the reaction mixture stirred for 3 hours. At the end of the stirring period, water was added and a product identified by infrared spectrum as 1-phenyl-1 (p-toluenesulfonyl) 2-nitroethylene was obtained.

EXAMPLE XVII

This is an example of the method of the invention used to produce 1-(p-toluenesulfonyl) - 2 - benzenesulfonylethylene. 21.4 g. of the dihydrate of sodium p-toluenesulfinate was added to a mixture of 40 ml. of water and 40 ml. of methanol under stirring in a reaction flask. To this solution 38 g. of borax ($Na_2 4O_7 \cdot 10H_2O$) were added followed immediately by the addition of 11.9 g. (0.05 mole) of 1,2-dichloroethyl phenyl sulfone. The reaction mixture was then stirred for 8 hours and a reaction product identified by infrared spectrum as 1-(p-toluenesulfonyl)-2-benzenesulfonyl-ethylene was obtained.

EXAMPLE XVIII

This is an example of the preparation of 1,4 bis-(2-cyanovinylsulfonyl) butane by the method of the invention. Approximately 0.1 mole (18.6 g.) of the disodium salt of 1,4-butane bis-sulfinic acid were added to 100 ml. of methanol and to this solution was added 39.3 g. (0.4 mole) of potassium acetate. At this point, 37.3 g. (0.4 mole) of 2,3-dichloropropionitrile dissolved in 40 ml. of methanol were added to the sulfinate reaction mixture over a 15 minute period. A solid formed which was filtered and treated with chloroform. The chloroform solution was then decolorized with active carbon, dried with anhydrous magnesium sulfate; and then treated with Skelly Solve C solvent until the cloud point was reached. Crystals of 1,4 bis-(2-cyanovinylsulfonyl) butane identified by infrared spectrum were obtained.

EXAMPLE XIX

This example demonstrates the method of the invention used in preparing a substituted alkyl cyanovinyl sulfone. Approximately 14.1 g. (0.1 mole) of sodium cyanoethanesulfinate and about 19.6 g. of potassium acetate (0.2 mole) were introduced in 125 ml. of methanol under stirring to a reaction flask. At this point, 13.8 g. (0.11 mole) of 2,3-dichloropropionitrile in 25 ml. of methanol were added all at once and the stirring was continued for 5 hours. Cold water was added and the reaction mixture was worked up producing cyanovinyl cyanoethyl sulfone as identified by infrared spectrum.

EXAMPLE XX

This example demonstrates the method of the invention used to prepare a cycloalkyl cyanovinyl sulfone. Into 150 ml. of methanol in a reaction flask, 17 g. (0.1 moles) of sodium cyclohexanesulfinate and 19.6 g. of potassium acetate were introduced under stirring. To this, 25 ml. of water were added followed by 12.4 g. of 2,3-dichloropropionitrile. The reaction mixture was stirred for 6 hours and then 100 ml. of cold water were added thereto. The mixture was then worked up and produced cyclohexanesulfonylacrylonitrile identified by infrared spectrum.

EXAMPLE XXI

This is an example of the method of the invention used in the preparation of a heterocyclic sulfonylacrylonitrile. Approximately 0.1 mole (16.5 g.) of the sodium salt of pyridinesulfinic acid was dispersed in a mixture of 100 ml. of methanol and 50 ml. of water and charged to a reaction flask. To this, 19.6 g. (0.2 moles) of potassium acetate were added and the mixture was stirred for 20 minutes. A solution of 2,3-dichloropropionitrile in 30 ml. of methanol was added to the mixture over 10 minutes and the stirring was continued for 3 hours. The reaction mixture was worked up to give pyridinesulfonylacrylonitrile as identified by infrared spectrum.

Having thus described the invention, what is claimed is:

1. A method of making an α,β-unsaturated sulfone of the formula $$RSO_2C=C-X$$
$$\quad\quad |\quad |$$
$$\quad\quad R_1\ R_2$$

wherein R, $R_1$, $R_2$, and X are defined herein below, comprising reacting in a liquid reaction medium which is substantially non-reactive with the reacting compounds and at a pH of about 4 to 11 a saturated vicinal dihalogenide of the formula $$Y-CH-ZC-X$$
$$\quad\quad |\quad\quad |$$
$$\quad\quad R_1\quad R_2$$

wherein $R_1$ is a member of the group consisting of hydrogen and phenyl, $R_2$ is a member of the group consisting of hydrogen and methyl, Y and Z are members of the group consisting of chlorine and bromine and X is an electron-withdrawing carbanion stabilizing group, with a sulfinic acid reactant of the formula $$R-SO_2-M$$

where R is a member of the group consisting of an alkyl having 1 to 18 carbon atoms, phenyl, alkylphenyl, aminophenyl, acetamidophenyl, hydroxy-carboxyphenyl and a cycloalkyl having up to 6 carbon atoms, and M is a member of the group consisting of alkali metals, alkaline earth metals, $NH_4$ and hydrogen, and wherein an alkaline material is added to said reaction medium in an amount which is at least one equivalent for each equivalent of said sulfinic acid reactant.

2. The method of claim 1 wherein the added alkaline material is an acetic acid salt.

3. The method of claim 1 wherein the liquid reaction medium is a mixture of a lower alkyl alcohol and water.

4. The method of claim 1 wherein the liquid reaction medium is maintained at about pH 5 to pH 9.

5. The method of claim 1 wherein the α,β-unsaturated sulfone is p-toluenesulfonylacrylonitrile, the vicinal dihalogenide is 2,3-dichloropropionitrile, the sulfinic acid reactant is sodium toluenesulfinate, the liquid reaction medium is a mixture of methanol and water, and the added alkaline material is sodium acetate.

6. The method of claim 1 wherein the α,β-unsaturated sulfone is p-acetamidobenzenesulfonylacrylonitrile, the vicinal dihalogenide is 2,3-dichloropropionitrile, the sulfinic acid reactant is sodium acetamidobenzene sulfinate, the liquid reaction medium is a mixture of methanol and water, and the added alkaline material is potassium acetate.

7. The method of claim 1 wherein the liquid reaction medium comprises a lower alkyl alcohol.

8. The method of claim 1 wherein the α,β-unsaturated sulfone is p-toluenesulfonylacrylamide, the vicinal dihalogenide is 2,3-dichloropropionamide, the sulfinic acid reactant is sodium p-toluenesulfinate, the liquid reaction medium is a mixture of methanol and acetone, and the added alkaline material is an alkali metal acetic acid salt.

9. A method of making an α,β-unsaturated sulfone of the formula

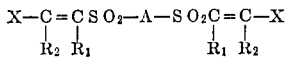

wherein A, $R_1$, $R_2$ and X are defined hereinbelow, comprising reacting in a liquid reaction medium which is substantially non-reactive with the reacting compounds and at a pH of about 4 to 11 a saturated vicinal dihalogenide of the formula

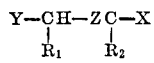

wherein $R_1$ is a member of the group consisting of hydrogen and phenyl, $R_2$ is a member of the group consisting of hydrogen and methyl, Y and Z are members of the group consisting of chlorine and bromine and X is an electron-withdrawing carbanion stabilizing group, with a bis-sulfonic acid reactant of the formula $$MSO_2—A—SO_2M$$

where A is an alkylidene, and M is a member of the group consisting of alkali metals, alkaline earth metals, $NH_4$ and hydrogen, and wherein an alkaline material is added to said reaction medium in an amount which is at least one equivalent for each equivalent of said bis-sulfinic acid reactant.

10. The method of claim 9 wherein the α,β-unsaturated sulfone is butane-bis cyanovinyl sulfone, the vicinal dihalogenide is 2,3-dichloropropionitrile, the bis-sulfinic acid reactant is the disodium salt of 1,4-butane bis-sulfinic acid, the liquid reaction medium is methanol, and the added alkaline material is an alkali metal acetic acid salt.

References Cited

UNITED STATES PATENTS

| | | | |
|---|---|---|---|
| 2,919,225 | 12/1959 | Heininger et al. | 260—465 X |
| 3,140,226 | 7/1964 | Stephens et al. | 260—465 X |
| 3,140,306 | 7/1964 | Heininger | 260—465 |

CHARLES B. PARKER, Primary Examiner

D. H. TORRENCE, Assistant Examiner

U.S. Cl. X.R.

260—283, 287, 289, 294.8, 329, 332.2, 332.3, 456, 464, 465, 465.6, 465.7, 465.8, 465.9, 468, 470, 476, 481, 487, 513.7, 514, 515, 518, 526, 539, 557, 558, 559, 561, 562, 578, 586, 590, 593, 598, 599, 601, 607, 644, 645, 646, 999